(No Model.)

E. HOUTZ & A. BROWN.
PLOW.

No. 349,220. Patented Sept. 14, 1886.

WITNESSES
Phille Mase
D. Fugitt.

INVENTORS
E. Houtz,
A. Brown,
by Anderson & Smith
Attorneys

UNITED STATES PATENT OFFICE.

EDWARD HOUTZ AND ARCHIE BROWN, OF BLUNT, DAKOTA TERRITORY.

PLOW.

SPECIFICATION forming part of Letters Patent No. 349,220, dated September 14, 1886.

Application filed June 19, 1886. Serial No. 205,688. (No model.)

*To all whom it may concern:*

Be it known that we, EDWARD HOUTZ and ARCHIE BROWN, citizens of the United States, residing at Blunt, in the county of Hughes and Territory of Dakota, have invented certain new and useful Improvements in Plows; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
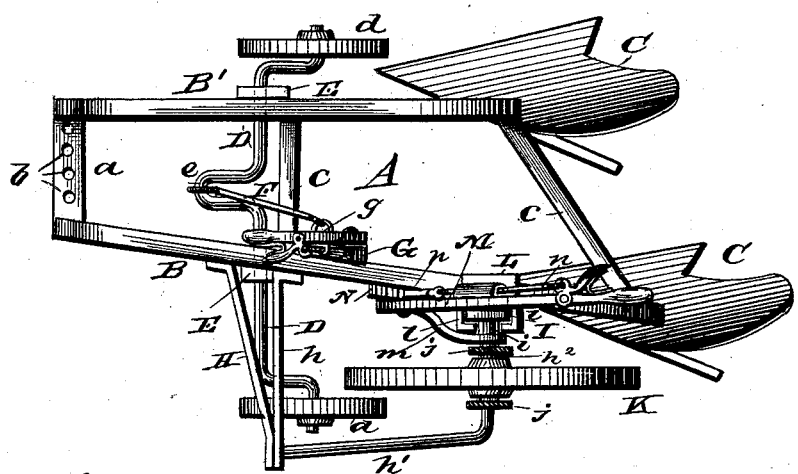
Figures 2, 3:
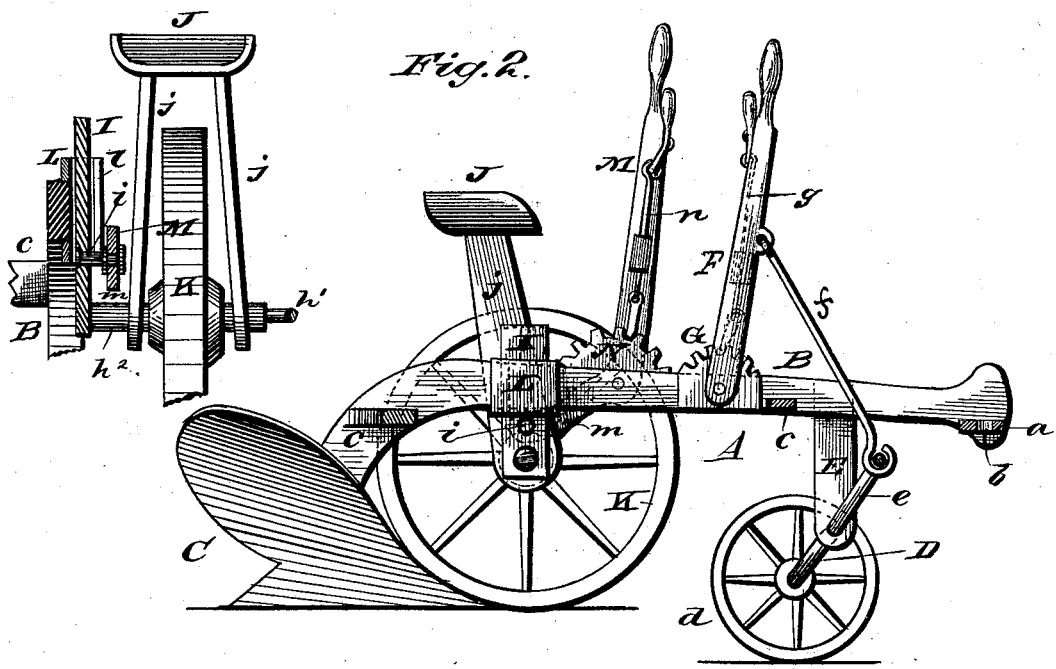

Figure 1 of the drawings is a representation of a plan view with the seat removed. Fig. 2 is a vertical section. Fig. 3 is a detail view, partly in section.

This invention relates to improvements in plows, and has special reference to that class of plows provided with seats, so that the workman can ride while operating the same.

The invention consists in the construction and novel arrangement of parts, as hereinafter described, and pointed out in the claims.

Referring by letter to the accompanying drawings, A designates the frame of the plow, of which the plow-beams B B' form part. The said beams have their front ends connected by the transverse bar $a$, provided with openings $b$, for the attachment of traces or a whiffletree, the plow having preferably no tongue.

C C are the plowshares secured to the rear ends of the beams B B', as shown.

$c\ c$ are transverse bars which connect the plow-beams together, so that they will at all times move parallel with each other.

D is the main axle of the plow, having on its ends the wheels $d$, and journaled in the arms E, depending from the plow-beams at suitable points toward their front ends.

$e$ is a crank upon the axle D, and $f$ is a link-rod connecting the said crank with the lever-handle F at about the middle point of the latter. The said lever-handle is pivoted at its lower end upon the plow-beam B, and is within easy reach from the driver's seat, hereinafter described.

G is a segmental rack secured to the beam B, and $g$ is a spring-controlled detent-bar attached to the lever F, and with its lower end adapted to engage between the teeth of said rack, as shown. By means of the rack and detent-bar the lever-handle F can be set and held at different inclinations to the plow-beam B, and the distance of the wheels $d$ from said beam consequently changed. The more the lever-arm is inclined forward the higher the said wheels will be raised in consequence of the link-rod moving the crank $e$ forward, and the deeper the plowshares C will enter the ground.

H is a frame secured to and standing outward from the side of the plow-beam B. This frame H is composed of a bracket, $h$, secured to and standing out from the plow-beam B, near the front of the same, and a bar, $h'$, having its front end secured to the said bracket, running thence rearward, about parallel with the plow-beam, and having its rear part bent inward to form an arm, $h^2$, which has rising from its inner end, adjacent to the plow-beam B, a standard, I, for a purpose hereinafter described.

J is the driver's seat, supported on the uprights $j\ j$, rising from the arm $h^2$ or a sleeve fixed thereon, and K is a third plow-wheel, of larger diameter than $d$, and turning freely on said arm between the uprights $j$, as shown.

The standard I passes through a guide-bracket, L, secured to or made upon the outer side of the plow-beam B.

$i$ is a pin on the outer surface of the standard, arranged to move up and down between the free vertical edges $l\ l$ of the bracket L.

M is a lever-arm pivoted to the outer surface of the plow-beam B, within easy reach of the driver's seat, and having on its lower end a rearward extension, $m$, provided with an opening, $m'$, near its end, into which the pin $i$ enters.

N is a segmental rack secured to the outer side of the beam B, and $n$ is a spring-controlled detent-rod attached to the lever-arm M, and having its lower end adapted to engage between the teeth of said rack, as shown.

From the described construction it is evident that the driver, by moving the lever M toward himself and causing the detent-rod $n$ to engage at the proper point between the teeth of the rack N, can depress the standard I, wheel K, and seat J with relation to the plow-beams, or, what is substantially the same thing, can elevate the rear end of the plow-frame, so that the points of the shares will be more inclined downward and will enter the ground deeply. By moving the lever M forward this action is reversed.

Some of the advantages of the construction are as follows: All three of the wheels run upon unplowed ground. The plow, being supported at three points, and having no tongue, can readily turn abrupt corners without raising the plowshares. The draft is much lessened and better guided by the support of the wheels. The plowshares can be quickly elevated and depressed by the described means when necessary, and the wheel-supports prevent the shares from hugging the landside and causing friction thereon as in the ordinary construction.

Having described this invention, what we claim, and desire to secure by Letters Patent, is—

1. The combination of the main frame composed of the plow-beams and connecting-strips, and supported upon an axle and wheels, the plowshares on the rear ends of said beams, the frame attached to the outer side of the beam B, composed of the bracket $h$ and bar $h'$, and supporting the driver's seat J, the wheel K, turning on the arm $h^2$ of the bar $h'$, the standard I, rising from said arm and having the rim $i$, the guide-bracket L and segmental rack N, secured to the beam B, the lever-arm M, pivoted to the beam B and having the extension $m$, and the spring-controlled rod $n$, attached to said arm and engaging the rack N, substantially as specified.

2. The combination of the main frame composed of the plow-beams and connecting-strips, the plowshares, the crank-axle, link-rod, lever-handle F, spring-controlled rod $g$, and segmental rack G, with the frame H, attached to the side of the main frame, wheel K, standard I, having the pin $i$, guide-bracket L, segmental rack N, lever-arm M, having the extension $m$, and spring-controlled rod $n$, substantially as specified.

In testimony whereof we affix our signatures in presence of two witnesses.

EDWARD HOUTZ.
ARCHIE BROWN.

Witnesses:
J. I. HOUTZ.
GEO. SCHLOSSER.